United States Patent
Nakaishi et al.

(10) Patent No.: US 7,670,719 B2
(45) Date of Patent: Mar. 2, 2010

(54) CELL STACK FOR REDOX FLOW BATTERY, AND REDOX FLOW BATTERY

(75) Inventors: Hiroyuki Nakaishi, Osaka (JP); Takashi Kanno, Osaka (JP); Seiji Ogino, Osaka (JP); Takefumi Ito, Osaka (JP); Toshio Shigematsu, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 126 days.

(21) Appl. No.: 11/979,670

(22) Filed: Nov. 7, 2007

(65) Prior Publication Data

US 2008/0081247 A1    Apr. 3, 2008

Related U.S. Application Data

(63) Continuation of application No. 10/480,117, filed as application No. PCT/JP02/04445 on May 7, 2002, now abandoned.

(30) Foreign Application Priority Data

Jun. 12, 2001    (JP) .............................. 2001-177221

(51) Int. Cl.
    *H01M 8/02*    (2006.01)
(52) U.S. Cl. ...................... 429/163; 429/185; 429/105; 429/34; 429/35
(58) Field of Classification Search ................. 429/185, 429/105, 34, 35, 163
    See application file for complete search history.

(56) References Cited

U.S. PATENT DOCUMENTS 6,555,267 B1    4/2003    Broman et al. .............. 429/210

FOREIGN PATENT DOCUMENTS

| JP | 63-216271 | 9/1988 |
| JP | 2-183968 | 7/1990 |
| JP | 5-15320 | 2/1993 |
| JP | 6-7157 | 1/1994 |
| JP | 8-7913 | 1/1996 |
| JP | P2000-260460 A | 9/2000 |
| JP | 2001-155758 A | 6/2001 |

OTHER PUBLICATIONS

European Search Report Issued in European Patent Application No. EP 02 72 4709 dated Aug. 26, 2009.

*Primary Examiner*—Jane Rhee
(74) *Attorney, Agent, or Firm*—McDermott Will & Emery LLP

(57) ABSTRACT

This invention provides a cell frame for a redox flow battery that prevents leakage of electrolyte out of the cell frame and also provides a good workability in assembling the redox flow battery. Also, this invention provides a redox flow battery using the cell frame. In the cell frame 30 for the redox flow battery 30 comprising a bipolar plate 21 and a frame 31 fitted around a periphery of the bipolar plate 21, the frame 31 has, on each side thereof, an inner seal and an outer seal to press-contact with a membrane and also seal electrolyte. The frame 31 has, on each side thereof, an inner seal groove 34 and an outer seal groove 35 for placing therein the inner seal and the outer seal, respectively, to prevent the electrolyte from leaking out, and O-rings are placed in the respective seal grooves.

9 Claims, 10 Drawing Sheets

CELL STACK FOR REDOX FLOW BATTERY, AND REDOX FLOW BATTERY

RELATED APPLICATIONS

This application is a continuation of U.S. application Ser. No. 10/480,117, filed Apr. 15, 2004, now abandoned which is a 371 of International application PCT/JP02/04445, filed May 7, 2002, which claims priority of Japanese Application No. 2001-177221, filed Jun. 12, 2001, the contents of which are hereby incorporated by reference.

TECHNICAL FIELD

The present invention relates to a cell frame for a redox flow battery designed to effectively prevent leakage of electrolyte out of the cell frame and to a redox flow battery using the same.

BACKGROUND ART

Referring to FIG. 8, there is shown an explanatory view showing an operating principle of a conventional redox flow secondary battery. The redox flow battery has a cell 1 separated into a positive electrode cell 1A and a negative electrode cell 1B by a membrane 4 that can allow ions to pass through. The positive electrode cell 1A and the negative electrode cell 1B include a positive electrode 5 and a negative electrode 6, respectively. A positive electrode tank 2 for feeding and discharging positive electrolytic solution to and from the positive electrode cell 1A is connected to the positive electrode cell 1A through conduit pipes 7, 8. Similarly, a negative electrode tank 3 for feeding and discharging negative electrolytic solution to and from the negative electrode cell 1B is connected to the negative electrode cell 1B through conduit pipes 10, 11. Aqueous solution containing ions that change in valence, such as vanadium ion, is used for the positive and negative electrolytes. The electrolyte containing the ions is circulated by using pumps 9, 12, to charge and discharge with the change in ionic valence at the positive electrodes 5 and negative electrodes 6.

Referring to FIG. 9, there is shown a diagrammatic illustration of construction of a cell stack used for the redox flow battery mentioned above. This type of battery usually uses the construction which is called a cell stack 100 comprising a plurality of cell frames 20 stacked in layers.

The cell stack 100 comprises a stack body formed by a cell frame 20, a positive electrode 5 made of carbon felt, a membrane 4, a negative electrode 6 made of carbon felt and the cell frame 20 being repeatedly stacked in this sequence. End plates are arranged at both sides of the stack body and are clamped onto the both sides of the stack body by tightening nuts screwably engaged with long bolts 101 piercing the both end plates, to thereby produce the cell stack 100.

The cell frame 20 comprises a bipolar plate 21 made of plastic carbon and a frame 22 formed around a periphery of the bipolar plate. The cell frame 22 usually has, in lower and upper sides thereof, holes which are called manifolds 23A, 23B for feeding and discharging the electrolytes to and from their respective cells and guide grooves 24 extending continuously from the manifolds for guiding the electrolyte to the electrodes 5, 6.

Referring now to FIG. 10, there is shown a partially enlarged view schematically showing a section around a frame when conventional cell frames are stacked in layer. A seal using an O-ring (FIG. 10(a)-(c)) disclosed by Japanese Laid-open (Unexamined) Patent Publication No. 2000-260460 and a seal using a flat packing (FIG. 10(d)) disclosed by Japanese Laid-open (Unexamined) Patent Publication No. Hei 8-7913 are known as a mechanism for preventing leakage of electrolyte from between the cell frames.

Cell frames 20a shown in FIG. 10(a) each have O-ring grooves 25 formed at locations opposite to each other on both sides thereof, one for each side, and O-rings 26 are fitted in the O-ring grooves 25.

Cell frames 20b shown in FIG. 10(b) each have an inner O-ring groove 25a formed on one side thereof and an outer O-ring groove 25b formed on the other side, both grooves being provided at locations staggered with respect to each other, and an inner O-ring 26a and an outer O-ring 26b are fitted in the grooves 25a, 25b, respectively.

Cell frames 20c shown in FIG. 10(c) each have the inner O-ring groove 25a and the outer O-ring groove 25b, different in size from each other, which are formed on one side thereof, so that one pair of the grooves 25a, 25b is arranged in parallel with each other, and the inner O-ring 26a and the outer O-ring 26b are fitted in the grooves 25a, 25b, respectively, as is the case with the above.

Cell frames 20d shown in FIG. 10(d) each have a flat packing 27, corresponding in shape to the cell frame 20d, which is arranged on each side.

For a redox flow battery of a relatively small size, a seal using a heat fusion bonding method listed in "provisions for power storage battery system" is also known.

The cell stacks using the conventional cell frames described above have the following problems, however.

(1) It is difficult to prevent leakage of electrolyte from between the cell frames effectively, ① In the cell stack using the cell frames 20a-20c shown in FIG. 10(a)-(c), part of the membrane 4 projected outwardly of the O-ring 26, 26a is not kept in its wet condition due to dryness and thus is sometimes broken. When the break in the membrane progresses inwardly with respect to the O-ring 26, 26a, there is a possibility that the electrolyte may leak out of the cell frames 20a-20c through that break.

② The flat packing 27 shown in FIG. 10(d) is desirable for the cell frame of a large area to produce a high capacity. However, when the cell frames 20d are stacked in layers, with the flat packing 27 interposed therebetween, the flat packing 27 must be positioned precisely with respect to the cell frames and also the cell frames 20d stacked in layers must be clamped uniformly by a number of long bolts 101, in order to prevent the leakage of electrolyte.

(2) Workability in a Cell Stack Assembly is Poor

① In the cell stack using the cell frames 20b, 20c shown in FIGS. 10(b) and (c), since the membrane 4 between the cell frames is set so that its periphery is positioned to be above the inner O-ring 26a but inside of the outer O-ring 26b, the membrane 4 must be cut to extremely close tolerance. In addition, the membrane 4 cut with a very high degree of precision must be aligned to the cell frames precisely, thus involving very poor workability in producing the cell stack.

② In the cell stack using the flat packing 27 shown in FIG. 10(d), the flat packing 27 must be also aligned to the cell frames 20d precisely, thus involving very poor workability in assembling the cell stack.

③ In the seal using a heat fusion bonding method, as a size of the cell frame increases, the fusion bonding work becomes complicated, involving difficulties in the application of the seal. Also, the use of this type of seal causes cost increase.

Accordingly, it is a primary object of the present invention to provide a cell frame for a redox flow battery that effectively prevents leakage of electrolyte out of the cell frame and also provides a good workability in assembling the redox flow battery.

It is another object of the present invention to provide a redox flow battery using that cell frame.

DISCLOSURE OF THE INVENTION

The present invention provides a novel cell frame for a redox flow battery comprising a bipolar plate and a frame formed around a periphery of the bipolar plate, wherein the frame has, on each side thereof, an inner seal and an outer seal to press-contact with a membrane and also seal electrolyte.

In the cell frame for the redox flow battery of the present invention, when the cell frames are stacked with the membrane sandwiched therebetween, the membrane is held in sandwich relation between the inner seals and the outer seals. Then, the inner seals mainly work to prevent leakage of the electrolytes to the outside of the cell stack and mixture of the positive electrolyte and the negative electrolyte. The outer seals work to prevent a break in the membrane caused by dryness from propagating inwardly with respect to the outer seals, thereby preventing the leakage of the electrolytes to the outside of the cell stack. In short, according to the present invention, the membrane is held in sandwich relation between both the inner seals and the outer seals, thereby preventing the break in the membrane from progressing inwardly from a location where the membrane is sandwiched between the inner seals. Thus, this double seal arrangement of the present invention can ensure a high reliability with which the electrolytes are prevented from leaking out of the cell frame.

The arrangement of the outer seals can allow slight projection of the membrane from a periphery of the cell frames. Due to this, strictness is not required for fabrication precision of the membrane and positional precision of the membrane to the cell frame, thus providing very good workability in assembling the cell stack by stacking the cell frames in layers. Further, the double seal arrangement can also serve to surely keep the membrane sandwiched between the cell frames in the wet condition.

In the following, the present invention will be described in detail.

An O-ring is preferably used for both the inner seal and the outer seal. At least the inner seal should preferably be in the form of the O-ring, though a flat packing may be used for the outer seal. The cell frame may previously be provided with a groove suitable for the flat packing and an O-ring groove.

Preferably, the grooves for fitting therein the O-ring or the flat packing are provided at locations correspond to each other on both sides of the cell frame. The grooves may alternatively be provided at locations staggered with respect to each other on both sides of the cell frame when the cell frames having both seals are disposed opposite to each other.

It is preferable that the inner seal and the outer seal are spaced apart from each other at a distance so that even when the membrane is dried and thereby broken, the break in the membrane cannot easily be propagated inwardly from the inner seal. To be more specific, the inner seal and the outer seal are spaced apart from each other at a distance of 1 mm or more. The distance means a distance between center lines of the both grooves.

In the cell frame for the redox flow battery of the present invention, it is preferable that the cell frame is provided with a manifold serving as a flow channel of the electrolyte and a guide groove for guiding the electrolyte from the manifold to an inside of the frame, and the guide groove has a sectional area of 5 mm$^2$ or less. The sectional area defined herein is a sectional area of a single guide groove when a plurality of guide grooves are formed. As the sectional area of the guide groove increases, a quantity of electrolyte flowing through the single guide groove increases and thereby losses caused by electric current flowing in the electrolytes increase. Also, in the case where the guide groove has a large sectional area, when the cell frames are stacked and clamped, the clamping force is supported by a space in the groove, so there is the possibility that the space in the groove may be flattened out to break the groove, depending on a magnitude of the clamping force. Accordingly, the present invention specifies the sectional area of the guide groove, in order to suppress the losses caused by the electric current flowing in the electrolyte.

It is preferable that two or more manifolds are arranged on each of the upper and lower sides of the frame of the cell frame. By increasing the number of electrolyte circulation holes, pressure losses in the electrolyte circulation can be reduced substantially. The manifolds on the lower side of the cell frame may be used for feeding the respective electrolytes and the manifolds on the upper side of the cell frame may be used for discharging the respective electrolytes. For further reduction of the pressure losses in the electrolyte circulation, a diameter of the manifold is preferably in the range of 1%-5% of a total width of the cell frame. Also, a center distance between adjacent manifolds is preferably in the range of 5%-50% of a total width of the cell frame. The center distance is specified for making uniform the flow of the electrolyte in the widthwise direction in the interior of the cell frame.

The cell frame of the present invention is preferably formed to be so transparent that one can easily inspect the each other's bonded state of the frame members and the bonded state of the frame member to the bipolar plate. Particularly, the cell frame may be formed into shape by an injection molding using resin. There are two methods of integrating the frame and the bipolar plate. ①One method is that two frame members produced in an injection molding and the like are prepared and joined together to form the frame and also an outer periphery of the bipolar plate is sandwiched between inner peripheries of the both frame members. ② Another one is that the frame is formed in the injection molding using the bipolar plate as a core.

It is preferable that the each frame is configured so that the locations of the manifolds and the guide grooves can be symmetrical in relation to an intersection point of diagonal lines of the frame members as a center. The frame members symmetrical with respect to a point can all be formed into the same configuration, because they can be combined with each other by simply changing orientation. Thus, the frame members can be molded from the same mold, thus providing good productivity.

In the redox flow battery using the cell frame of the present invention, it is preferable that the membrane has a thickness of 400 µm or less. This is because the membrane having a thickness of 400 µm or less is desirable in that it can provide reduced inner electrical resistance and thus improved battery efficiency.

Also, in the redox flow battery using the cell frame of the present invention, it is preferable that electric terminals for taking out electricity from the electrodes and feeding and discharging portions for feeding and discharging electrolytes to and from the electrodes are arranged on the opposite sides of the cell stack. This arrangement wherein the electric terminals and the feeding and discharging portions are arranged on the opposite side to each other can provide ease of maintenance as well as good workability in assembly of the battery. Further, this arrangement can provide the advantage that even when the electrolyte leaks from the supply/discharge portions, the electrical terminals are kept out of the leakage of the electrolyte, so that there is little possibility that electric current may pass through a power line.

BEST MODE FOR CARRYING OUT THE INVENTION

In the following, certain preferred embodiments of the present invention are described.

Figure 8:
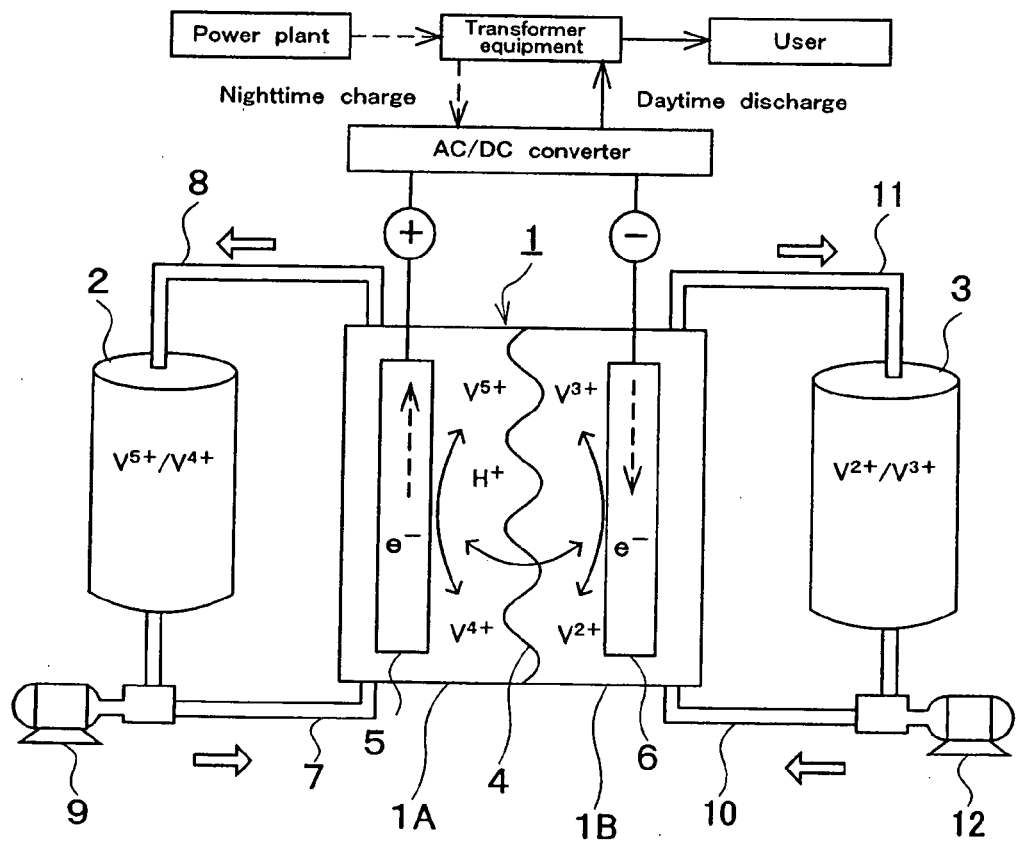
FIG. 8 is an explanatory view of an operating principle of the conventional redox flow battery.
Figure 9:
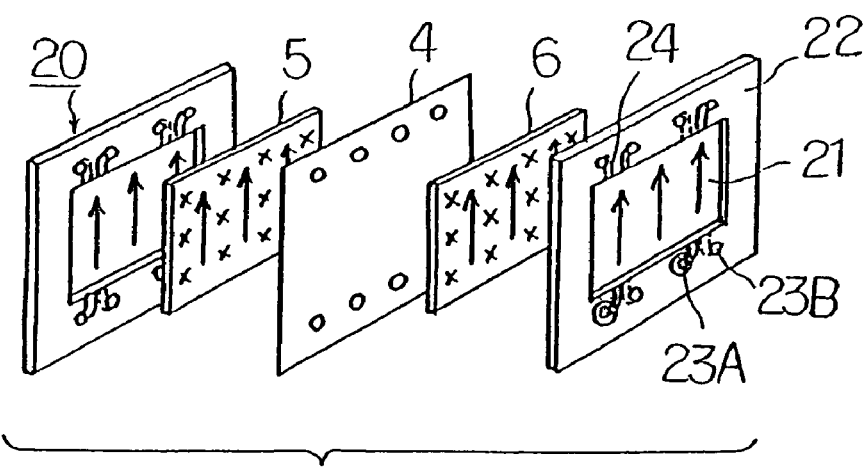
FIG. 9 is a diagrammatic illustration of construction view of the cell stack used for the redox flow battery.
Figure 9:
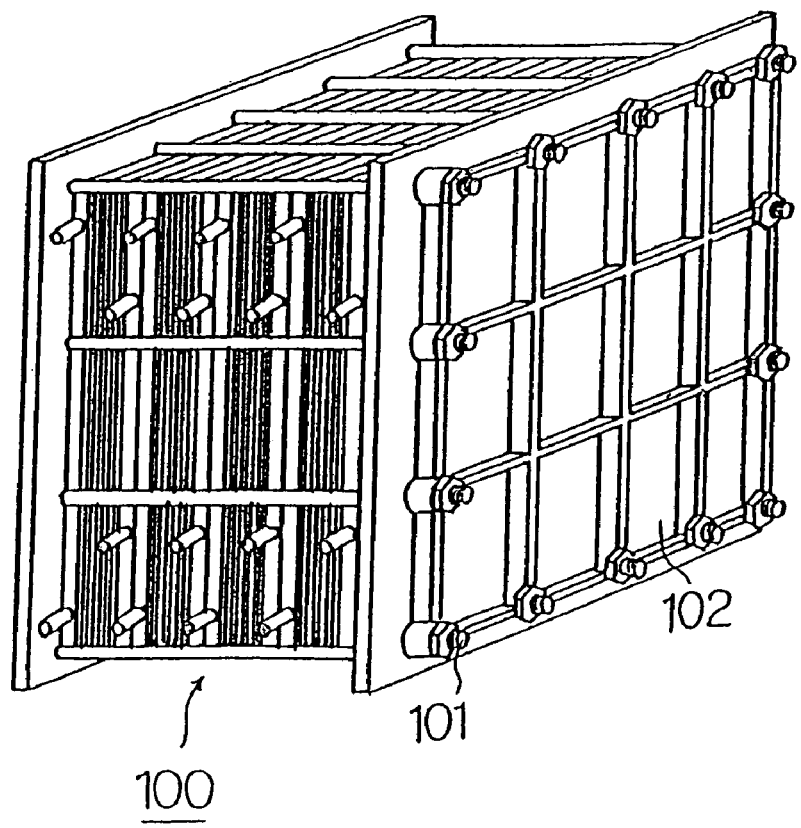
Figure 10:
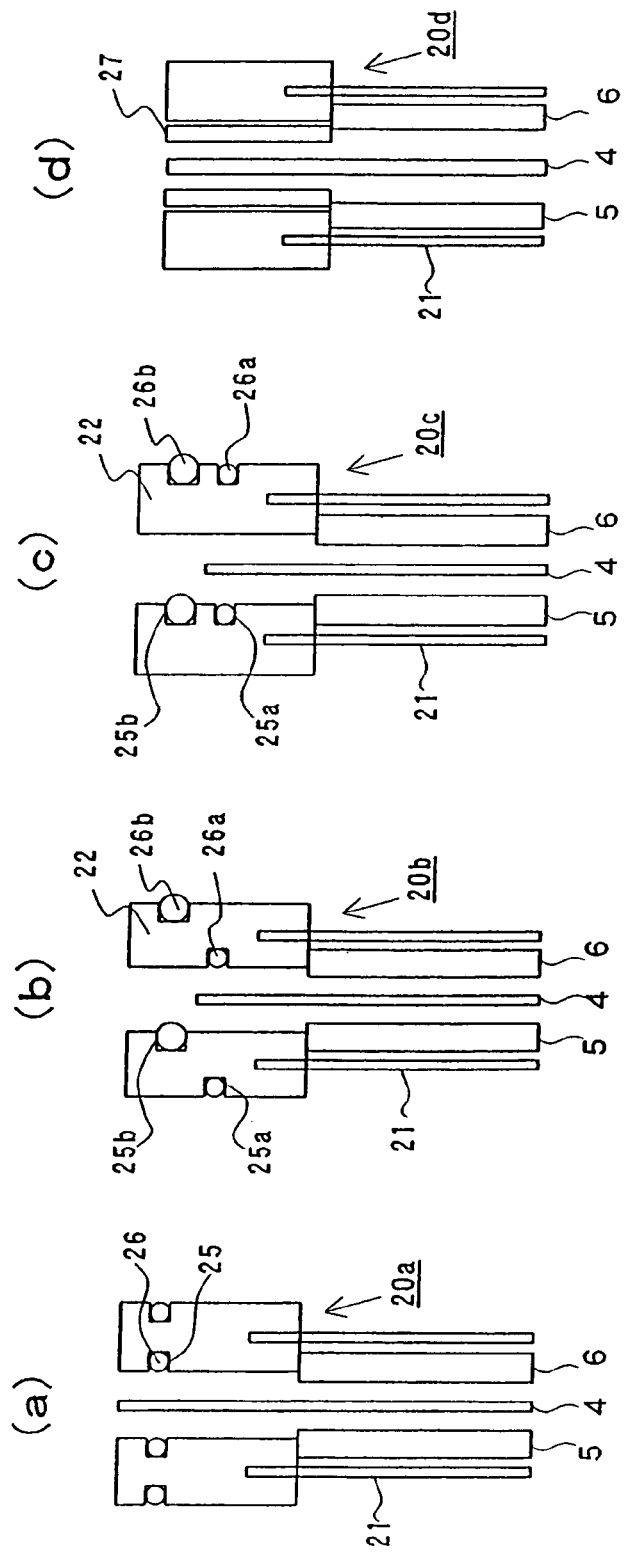
FIG. 10 is a partially enlarged view schematically showing a section around a frame of conventional cell frames when stacked in layer.

A redox flow battery of the present invention operates in the same operation principle as that of the redox flow battery shown in FIGS. 8, 9, using a basically common overall cell stack construction. In the following, the components of the cell stack will be described in detail.

Figure 1:
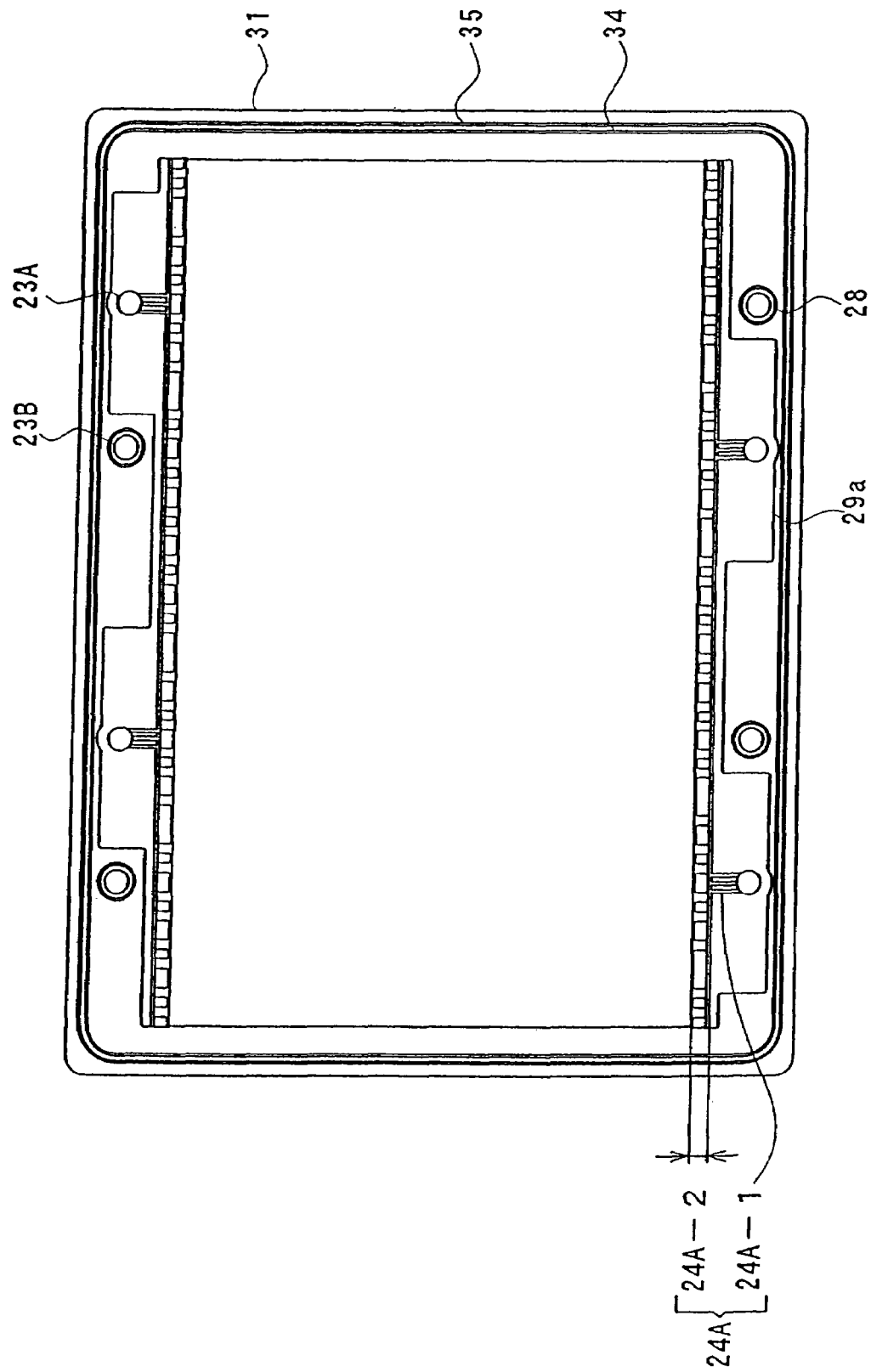
FIG. 1 is a plan view of a frame member forming a cell frame of the present invention.
Figure 2:
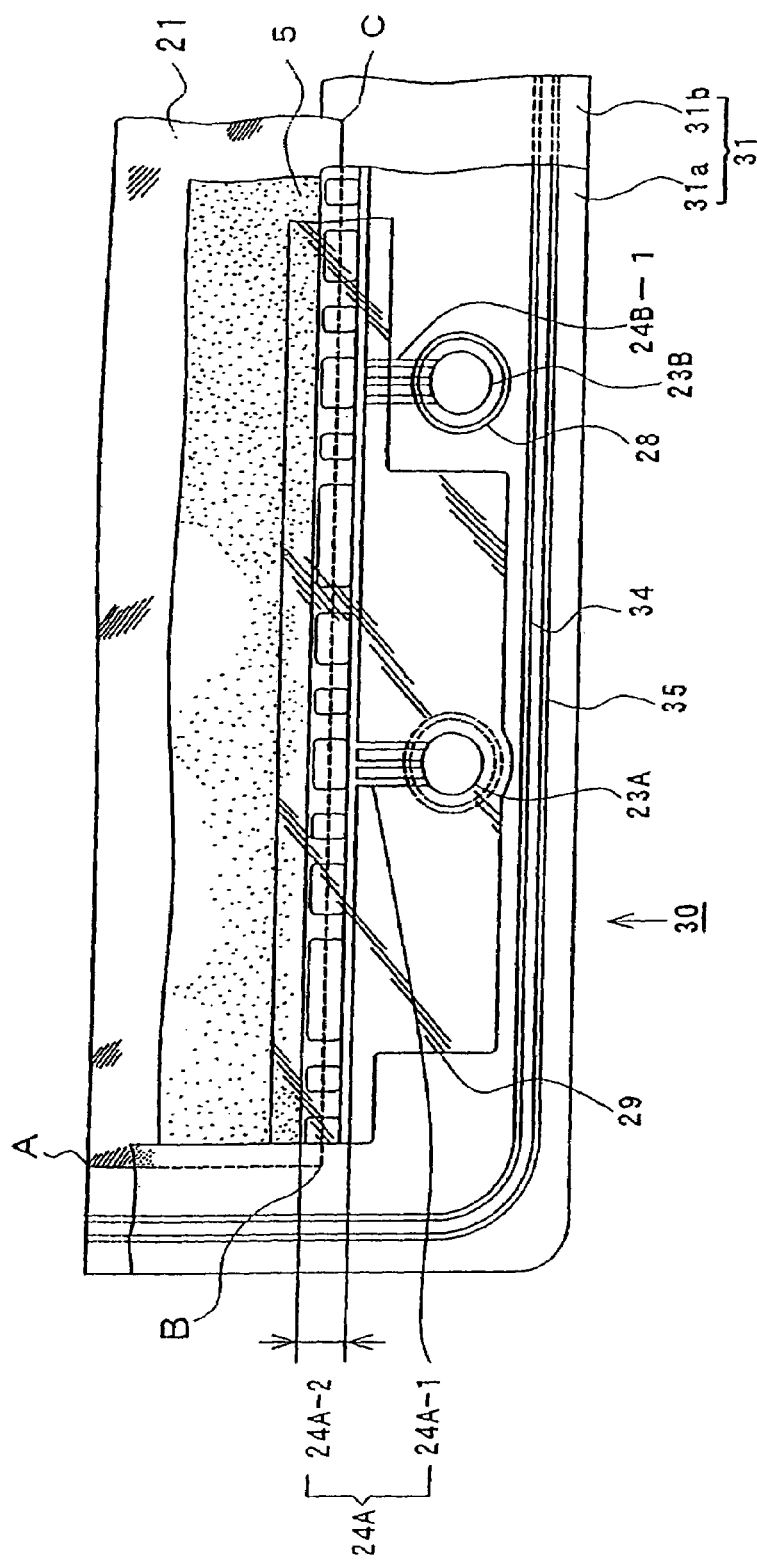
FIG. 2 is a partially enlarged view of an area in the vicinity of the frame of the cell frames of the present invention stacked in layer.
Figure 3:
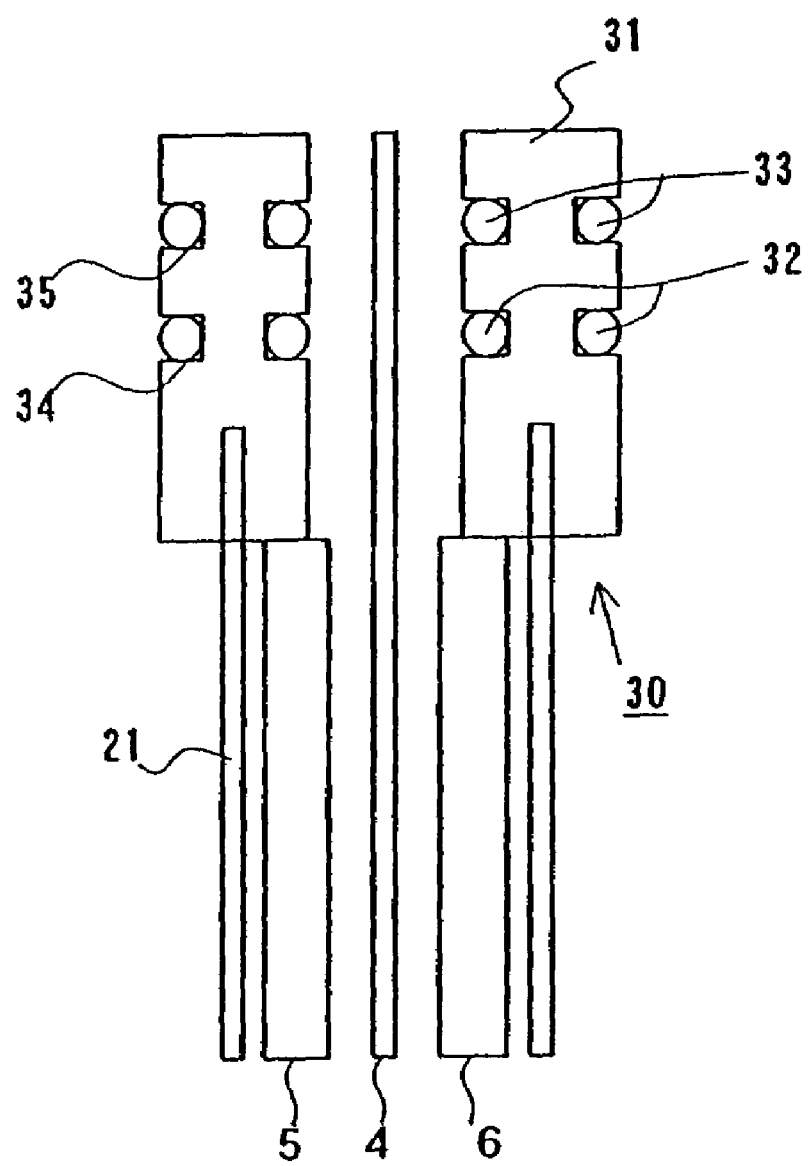
FIG. 3 is a partially enlarged view schematically showing a section around the frame of the cell frames of the present invention stacked in layer.

FIG. 1 is a plan view of a frame member forming a cell frame of the present invention. FIG. 2 is a partially enlarged view of an area in the vicinity of the frame of the cell frames of the present invention stacked in layer. FIG. 3 is a partially enlarged view schematically showing a section around the same frame. In illustration, like reference numerals denote like parts.

(Cell Frame)

Cell frames 30 of the present invention each comprises a bipolar plate 21 and a frame 31 formed around a periphery of the bipolar plate 21, as shown in FIG. 2. The cell frames 30 are stacked with each other, sandwiching therebetween a membrane 4 for allowing ions in electrolyte to pass through (FIG. 3). An inner seal 32 (FIG. 3) and an outer seal 33 (FIG. 3) for preventing leakage of electrolyte out of the frame 31 are arranged on each side of the frame 31. When the cell frames 30 are stacked with each other sandwiching the membrane 4 therebetween, those cell frames are press-contacted with both sides of the membrane 4 to hold the membrane 4 in sandwich relation between the seals 32, 33.

In the cell frame 30, the bipolar plate 21 is disposed between a pair of frame members 31a, 31b forming the frame 31, so that an outer periphery of the bipolar plate 21 is joined to inner peripheries of the frame members 31a, 31b. The frame members 31a, 31b forming this cell frame 30 are formed by an injection molding or equivalent using plastics or rubbers, including vinyl chloride resin, polypropylene, polyethylene, fluorocarbon resin, and epoxy resin. A variety of materials may be used for the frame members 31a, 31b, as long as they have acid resistance, electrical insulating properties and mechanical strength.

The cell frame 30 has, on each side thereof, an inner seal groove 34 for fitting therein the inner seal 32 (FIG. 3) and an outer seal groove 35 for fitting therein the outer seal 33 (FIG. 3) which are arranged to extend in parallel along a periphery of the cell frame (See FIG. 1). The both seal grooves 34, 35 are spaced apart from each other at a distance of not less than 1 mm. In this embodiment, the seal grooves 34, 35 are provided at locations correspond to each other on both sides of the cell frame 30. The seal grooves 34, 35 may alternatively be provided at locations staggered with respect to each other on both sides of the cell frame 30.

The cell frames 30, each having a double seal arrangement of the seals 32, 33, can prevent the electrolyte from leaking out of the cell frames 30 when stacked in layers. In detail, when the cell frames 30 are stacked in layers and then clamped by long bolts, the inner seals 32 confronting each other are brought into press-contact with both sides of the membrane 4 (FIG. 3) to sandwich the membrane 4 therebetween. This can prevent the electrolyte from leaking out of the cell frames 30 while streaming along the membrane 4 and also can prevent the positive electrolyte and the negative electrolyte from being mixed with each other. Also, the outer seals 33 confronting each other are also brought into press-contact with both sides of the membrane 4 to sandwich the membrane 4 therebetween. This can provide the result that even when part of the membrane 4 projected outwardly from the outer seals 33 is broken due to dryness, the outer seals 33 can prevent the break in the membrane from progressing inwardly with respect to the outer seals 33, to prevent the electrolyte from leaking out of the cell frames 30 through the break in the membrane 4.

Each of the cell frames 30 has a plurality of manifolds 23A, 23B formed in its long sides, as shown in FIG. 1. The manifolds 23A, 23B are arranged to form flow channels of the electrolytic solutions extending in a stacking direction of the cell frames when a number of cell frames are stacked in layers. In the illustrated embodiment, the each cell frame has four manifolds formed on its upper side and four manifolds formed on its lower side or a total of eight manifolds. The manifolds arranged along the long side of the cell frame 30 are alternately used as a positive electrolyte manifold 23A and a negative electrolyte manifold 23B. The manifolds 23A, 23B on the lower side of the cell frame 30 are arranged in the order of the positive electrolyte feeding manifold and the negative electrolyte feeding manifold. The manifolds on the upper side of the cell frame 30 are arranged in the order of the positive electrolyte discharging manifold and the negative electrolyte discharging manifold. Diameters of these manifolds may be varied in consideration of the number and size of the cell frames so that pressure losses of the electrolytes passing through the manifolds can be reduced. In addition, a center distance between these manifolds 23A, 23B may also be varies in consideration of the number and size of the cell frames. O-rings (not shown) to seal the space between the cell frames are fitted in circular grooves 28 formed around the manifolds 23B.

Further, the each cell frame 30 has, on a front side thereof, a circulation portion 24A of the electrolyte. The circulation portion 24A comprises electrolyte guide grooves 24A-1 extending from the manifolds 23A and rectifying portions 24A-2 for allowing the electrolyte flowing through the guide grooves 24A-1 to diffuse along an edge of the positive electrolyte 5 (FIG. 2). The guide grooves 24A-1 each have a rectangular section form having a round edge. In this embodiment, there are provided a number of guide grooves 24A-1, each having a sectional area of not more than 5 mm$^2$, so that losses caused by electric current flowing in the electrolytes can be suppressed. The rectifying portions 24A-2 are formed by rectangular projections and depressions formed along the long side of the cell frame 30. The electrolyte is guided to the positive electrode 5 through the depressions. The number and shape of the guide groove 24A-1 and of the rectifying portion 24A-2 are not limited to those illustrated in this embodiment.

In the illustrated embodiment, the frame members are configured to be symmetrical with respect to a point (FIG. 1). Specifically, the circulation portions 24A-1, 24A-2 in one long side of the frame member and the circulation portions in the other long side thereof are configured to be symmetrical in relation to an intersection point of diagonal lines of the frames as a center. Thus, the cell frames of the frame members being joined to each other are also configured to be symmetrical with respect to the point. This arrangement can provide the result that even when either of the one long side of the cell frame and the other long side of the same is put upside, the orientation of the circulation portions is kept unchanged, thus providing the advantage that the stacking work of the cell frames can be performed without paying any attention to their vertical orientations. In addition, the configuration that the frame members are formed to be symmetrical with respect to the point can also provide the advantage that the frame members can be molded from the same mold, thus providing good workability.

Preferably, the cell frames 30 have a thickness in the range of 2 mm or more to 8 mm or less, or preferably 3 mm or more to 6 mm or less. It is the reason for the limitation of the thickness of the cell frame to not less than 2 mm that for the cell frame of less than 2 mm thick, it is difficult to form the seal groove therein and also it is infeasible to apply sufficient pressure to the positive electrode 5 and the negative electrode 6 (FIG. 3) arranged between the cell frames 30, providing an increased contact resistance with the bipolar plate 21 (FIG. 3). On the other hand, it is the reason for the limitation of the thickness of the cell frame to not more than 8 mm that for the cell frame of more than 8 mm thick, the electrodes 5, 6 are also increased in thickness with the increase in thickness of the cell frame, so that pressure loss is increased for a required amount of electrolytes to pass through. That is to say, when having a thickness in the range of 2 mm or more to 8 mm or less, or preferably 3 mm or more to 6 mm or less, the cell frames 30 can provide sufficient liquid seal, providing improved battery efficiencies when used for the redox flow battery.

The guide groove 24A-1 and the rectifying portion 24A-2 are covered with a plastic protection plate 29, when the cell frames are stacked as shown in FIG. 2. The protection plate 29 has a circular hole formed in a position corresponding to the manifold 23A and also has a size to cover an entire area of the guide groove 24A-1 and the rectifying portion 24A-2 and an area extended slightly upwardly from the rectifying portion 24A-2. The protection plate 29 serves to define a circulation passage of the electrolyte by covering upper portions of the guide groove 24A 1 and the rectifying portion 24A-2 with it. Also, the protection plate 29 covering projections and depressions of the guide groove 24A-1 and rectifying portion 24A-2 serves to protect the membrane 4 from tear or damage that can be caused by the direct contact with the guide groove 24A-1 and the rectifying portion 24A-2 when the cell frames are stacked. The protection plate 29 is made of sufficient size to cover the area extended slightly upwardly from the rectifying portion 24A 1 as well, for the purpose of providing the function as a holder to hold upper and lower end portions of the positive electrode 5 or negative electrode between the protection plate 29 and the bipolar plate 21, to thereby produce improved workability in stacking the cell frames in layers. The protection plate 29 used has thickness of not more than 1 mm. Also, the cell frame 30 has a recessed portion 29a formed into a corresponding shape to the contour of the protection plate 29 (See FIG. 1), in order to facilitate the alignment of the protection plate 29.

As shown in FIG. 2, an outer edge of the bipolar plate 21 is positioned on broken lines indicated by A, B, C and both sides of the bipolar plate 21 are bonded to the back side of the each cell frame at a location thereof where the rectifying portion 24A-2 is formed. This arrangement can prevent the electrolyte passing through the guide groove 24A-1 and the rectifying portion 24A-2 from contacting directly with the bipolar plate 21. The positive electrode 5 is arranged precisely along the upper edge of the rectifying portion 24A-2. Although only the construction of the cell frame on the positive electrode 5 side, which is the front side of the cell frame, has been described above, the cell frame on the negative electrode side, on which the negative electrode is arranged on the back side of the cell frame through the membrane 4, has the same construction. While the rectifying portion to the negative electrode is provided on the back side of the cell frame as in the case of the cell frame on the positive electrode 5 side, it is omitted herein and only the guide groove 24B-1 is depicted by a broken line.

(Seal)

In this embodiment, O-rings are used for both of the inner seal and the outer seal. Preferably, the O-rings have a diameter of cross-section of 3 mm or less. The inner seal 32 (FIG. 3) and the outer seal 33 (FIG. 3) may be different in diameter of cross-section from each other. Outer diameters of the O-rings may be varied properly in accordance with the size of the cell frame 30.

(Membrane)

Material that allows ions to pass through, such as an ion-exchange membrane, is used for the membrane 4. The membrane 4 is formed, for example, from vinyl chloride, fluorocarbon resin, polyethylene or polypropylene. The membrane used has a thickness of 400 μm or less, or particularly preferably 200 μm or less, and a size slightly larger than an outer size of the frame 31 of the cell frame 30. A lower limit on the thickness of the membrane of the order of 20 μm is provided in the present circumstances.

(Bipolar plate and Electrode)

The bipolar plate 21 is a rectangular plate made of plastic carbon. The positive electrode 5 is disposed on one side of the bipolar plate and the negative electrode 6 is disposed on the other side of the bipolar plate, as shown in FIG. 3. This bipolar plate 21 may be formed from material comprising graphite, particles of carbon and chlorine. The bipolar plate used has a thickness of 0.1-1 mm and a size slightly larger than a rectangular space formed around an inner periphery of the frame 31. The electrodes 5, 6 used are formed of carbon fibers and are formed to have a size corresponding to the rectangular space formed around the inner periphery of the frame 31.

(Assembling Sequence of Cell Stack)

First of all, the fabrication sequence of the cell frame 30 of the present invention will be described. The frame members 31a, 31b are molded by a mold. After a pair of frame members 31a, 31b are prepared, a periphery portion of the bipolar plate 21 is adhesively bonded to inner periphery portions of the pair of frame members, to form the cell frame 30. The cell frames 30 are preferably formed using transparent material that one can easily inspect the each other's bonded state of the frame members 31a, 31b.

Then, the cell frames 30 of the present invention are stacked with the electrodes and the membranes.

Figure 4:
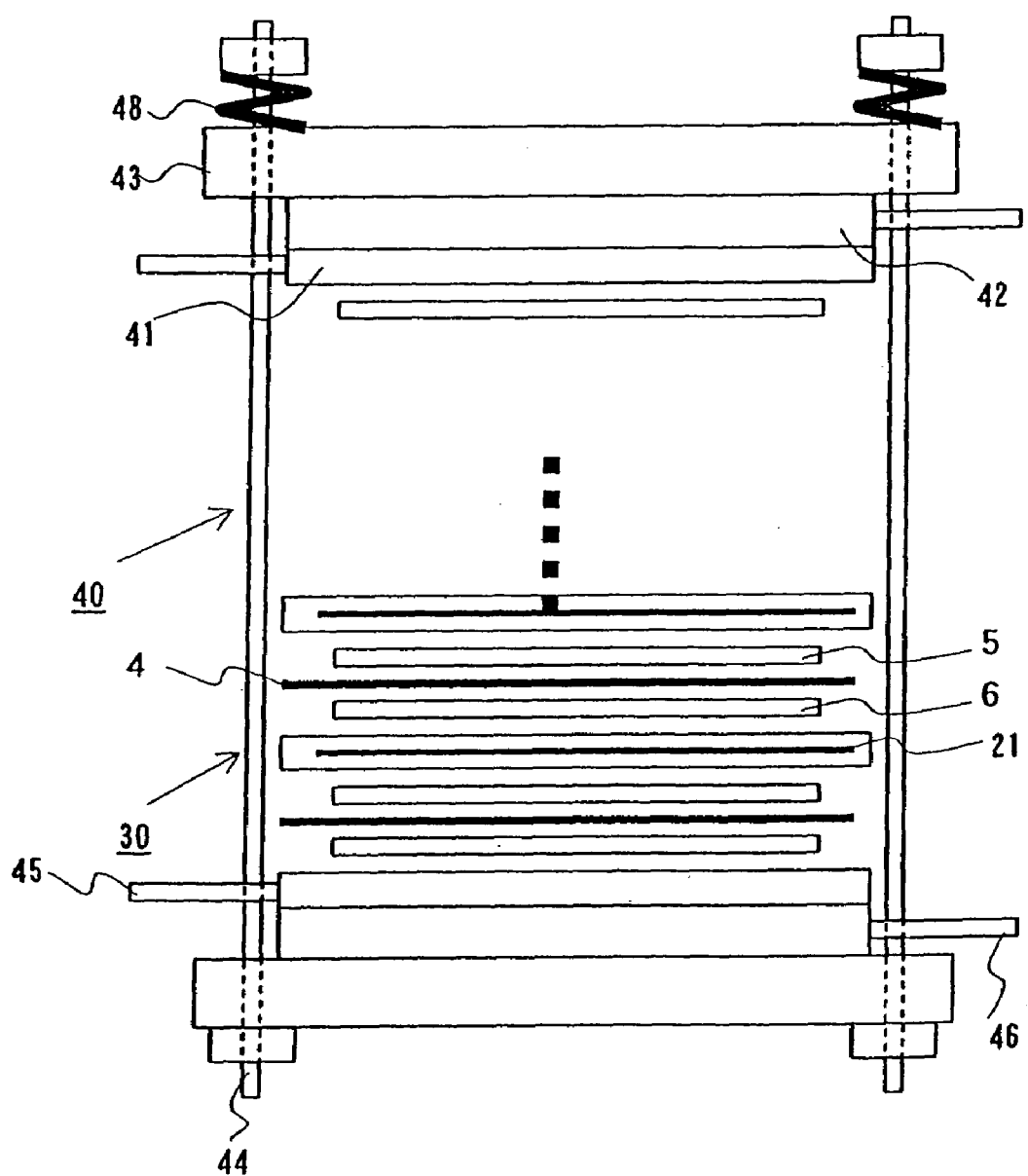
FIG. 4 is a top view schematically showing the cell stack using the cell frames of the present invention.
Figure 5:
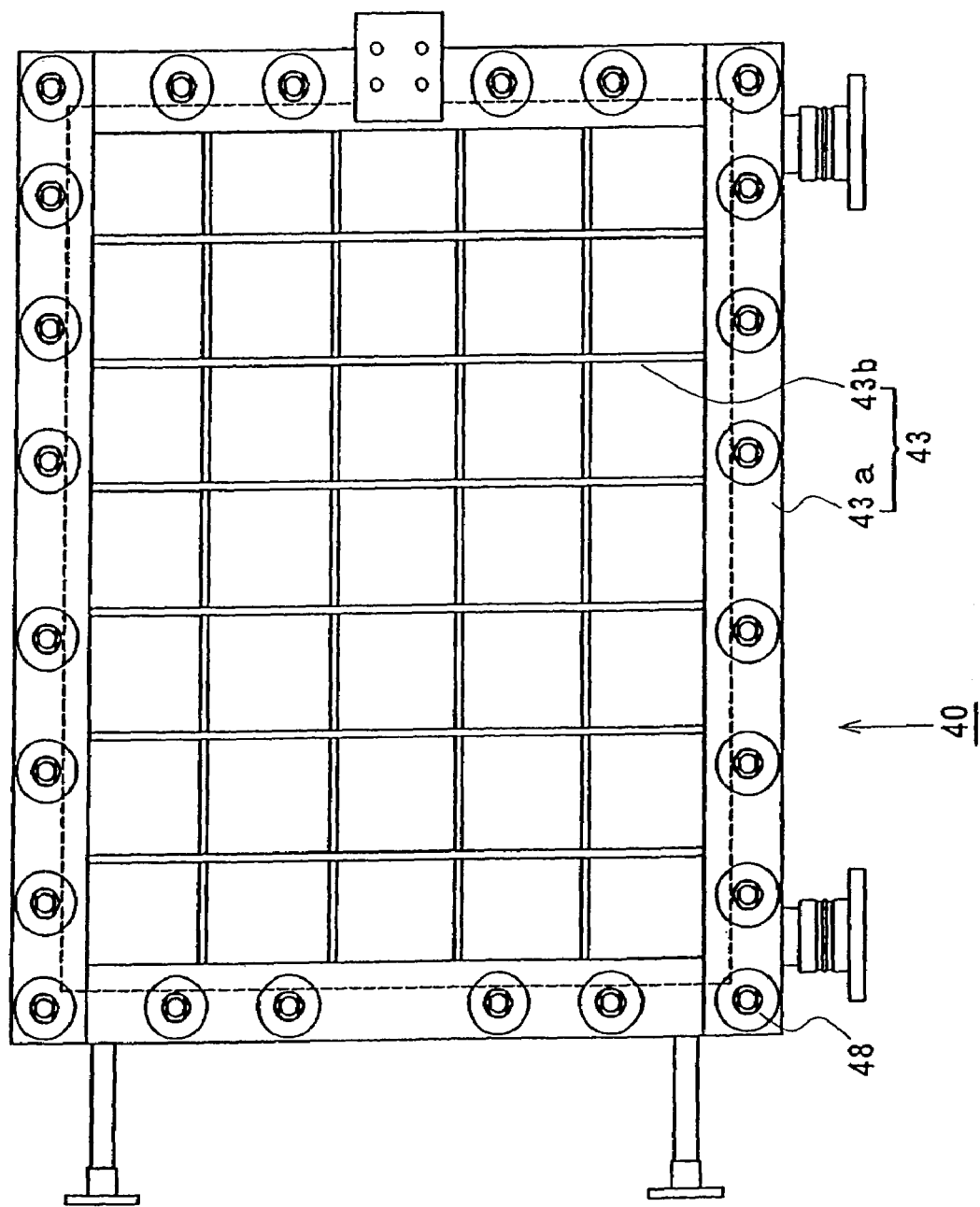
FIG. 5 is a front view of the cell stack using the cell frames of the present invention.
Figure 6:
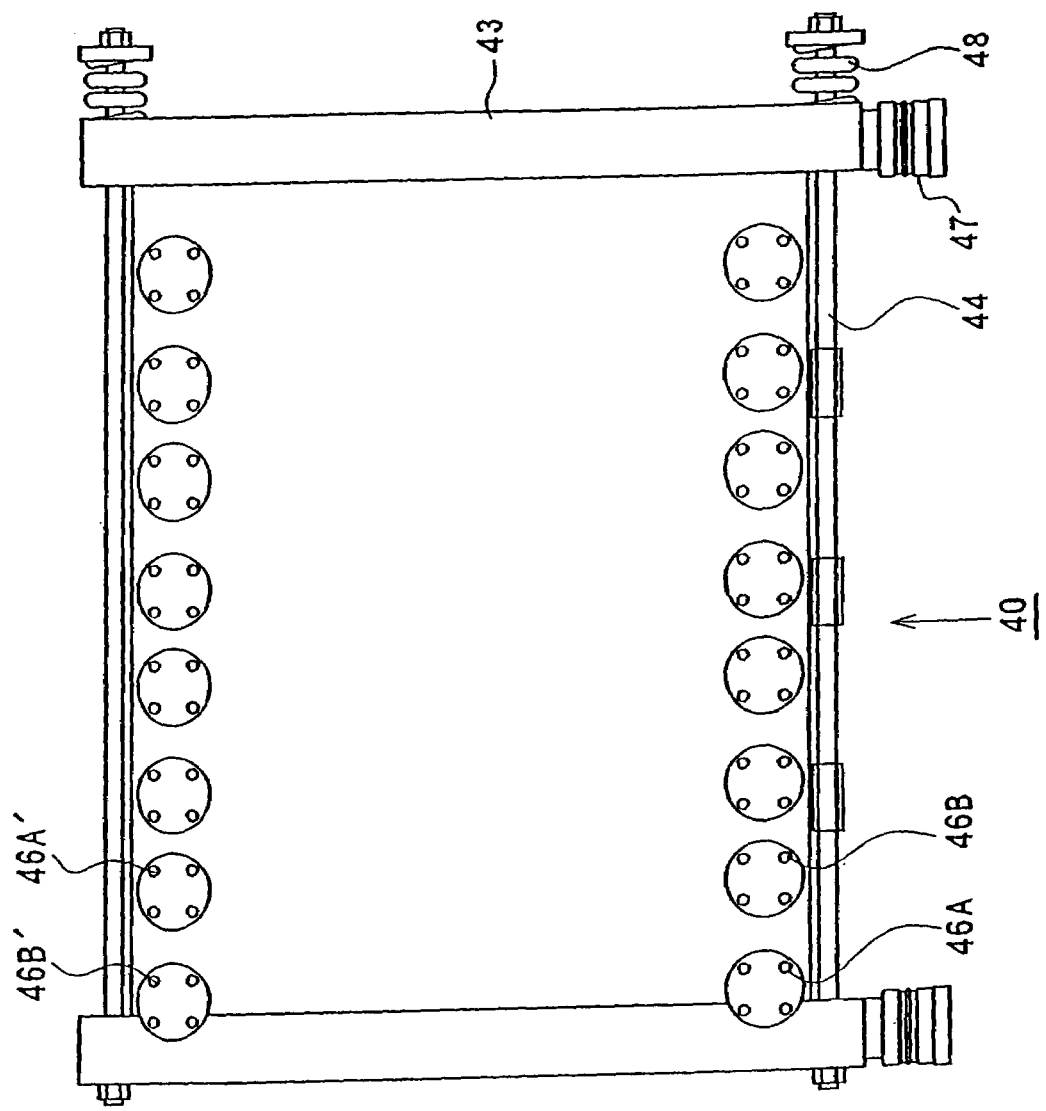
FIG. 6 is a left side view of the cell stack using the cell frames of the present invention.
Figure 7:
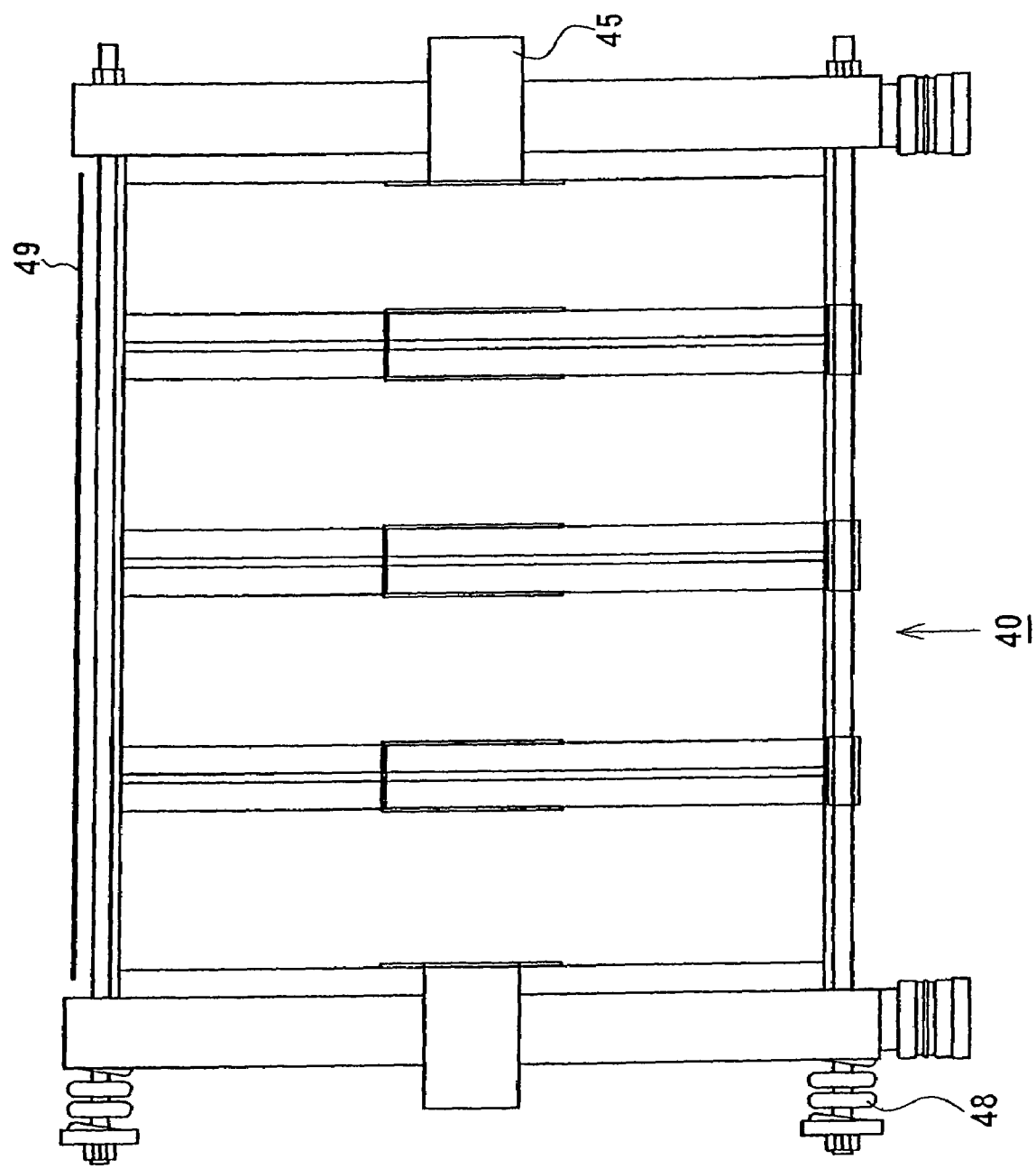
FIG. 7 is a right side view of the cell stack using the cell frames of the present invention.

FIG. 4 is a top view schematically showing the cell stack 40 using the cell frames 30 of the present invention. FIG. 5 is a front view of the cell stack 40. FIG. 6 is a left side view of the same. FIG. 7 is a right side view of the same. In the diagrams, like reference numerals denote like parts.

First, the positive electrode 5 is arranged on one side of the bipolar plate 21 of the cell frame 30 and the negative electrode 6 is arranged on the other side of the bipolar plate 21 and, then, the electrodes are held by the protection plate 29, as shown in FIG. 2. The inner seal 32 (FIG. 3) and the outer seal 33 (FIG. 3) are placed in the inner seal groove 34 and the outer seal groove 35 on both sides of the cell frame 30, respectively.

The cell stack 40 is formed in such a sequence that after the cell frames 30 comprising the bipolar plate 21, the electrodes 5, 6, the inner seal 32, and the outer seal 33 are stacked in layers to form a stacked body, the end frame 41, the plastic plate 42 made of vinyl chloride and the end plates 43 are arranged on each side of the stacked body, then tightening a number of long bolts 44 piercing from one end plate 43 to the other end plate 43. The end frame 41 is preferably formed by a copper plate having a plastic carbon sheet around an inside thereof. The copper plate can be surface-treated by plating, flame spray coating, vapor deposition and the like. The end frame 41 is provided with an electrical terminal 45 for electrical conduction. The plastic plate 42 is provided with a feed and discharge portion 46 for feeding and discharging the electrolyte. Preferably, the plastic plate 42 has a thickness of 10-50 mm.

The end plate 43 has, around its margin 43a, through holes (not shown) for the long bolts 44 to be extended through and also has a latticed support 43b in a rectangular space defined in the inside of the margin 43a, as shown in FIG. 5. The end plate 43 with the latticed support 43b is useful for bringing all areas of the end plates to be uniformly pressed on the cell frames 30 (FIG. 4) when the end plates are clamped by tightening nuts 50 at both ends of the long bolts 44. Also, it can hold substantially the same pressing force as the conventional end plate 102 (FIG. 9) of the combination of a flat portion and a latticed portion can do. In addition, since the rectangular space defined in the inside of the margin 43a of the end plate 43 is substantially in the form of a cavity, a least possible material is required for forming the end plate 43, thus reducing the weight of the end plate and thus reducing the burden on a worker when assembling the cell stack 40. Also, coil springs 48 are disposed around end portions of the long bolts 44 to absorb thermal expansion and contraction of the cell stack.

In this embodiment, the long bolts 44 each have an insulating coating formed at center portions thereof. While the membrane 4 is sandwiched between the cell frames, as previously mentioned, an outer edge of the membrane 4 is sometimes exposed slightly from an outer edge of the cell frame. The membrane 4 is impregnated with electrolyte. If the long bolts 44 contact with the membrane 4 exposed from the outer edge of the cell frame, electrical conduction through the long bolts can be caused. Consequently, the long bolts 44 placed in the vicinity of the outer edge of the cell frame are also provided with the insulating coating portions so that the electrical conduction through the long bolts can be prevented. In the cell stack, the end plates are isolated from the ground via an insulator support 47, in addition to the electrical isolation provided between the stacked body comprising the cell frames and the membranes and the long bolts. The insulating coating can be provided by painting, fitting of insulating thermal contraction tube or winding an insulating tape. The insulator support 47 serves as a support base of the cell stack, while ensuring the isolation between the cell stack 40 and the ground.

In this embodiment, electrolyte supply ports 46A, 46B and electrolyte discharge ports 46A', 46B' are arranged on an opposite surface of the cell stack 40 to a surface of the cell stack 40 on which the electrical terminals 45 are arranged, as shown in FIGS. 4, 6, 7. This arrangement in which the electrolyte supply ports 46A, 46B and discharge ports 46A', 46B' are arranged in the opposite direction to the electrical terminals 45 can provide ease of maintenance as well as good workability in assembly. Further, this arrangement can provide the advantage that even when the electrolyte leaks from the supply/discharge portions 46, the electrical terminals 45 are kept out of the leakage of the electrolyte, so that there is little possibility that electric current may pass through a power line. The electrolyte supply port 46A is for positive electrolyte and the electrolyte supply port 46B is for negative electrolyte. Also, the electrolyte discharge port 46A' is for positive electrolyte and the electrolyte discharge port 46B' is for negative electrolyte. A plate disposed over the cell stack 40 is a cover 49.

EXAMPLE 1

Using the cell stack mentioned above, a redox flow secondary battery was produced, and battery performances and discharge possible power of that redox flow secondary battery were measured. Data on material, size, and others of the cell stack and measurement results are shown below.

<Frame>
 Size
 Outer size: 1,000 mm wide, 800 mm high, and 5 mm thick,
 Inner size: 900 mm wide and 600 mm high,
 Seal groove: 3 mm wide, 1 mm deep, and 5 mm in distance between grooves,
 O-ring size: 1.5 mm in diameter of cross-section of the ring, and 1,000 mm in diameter,
 Inner and outer seal grooves: Arranged at the same locations on both sides of the cell frame,
 Ratio of diameter of manifold to total width of cell frame: 3%,
 Ratio of distance between adjacent manifolds to total width of cell frame: 30%,
 Cross-sectional area of guide groove: 5 $mm^2$,
 Material: Resin comprising 50 mass % vinyl chloride and 50 mass % acrylonitrile-butadiene-styrene copolymer (ABS),
 Manufacturing process: Injection molding,
<Bipolar Plate>
 Size: 0.5 mm thick,
 Material: Chlorinated polyethylene containing 10 mass % graphite,
<Electrode>
 Material: Carbon felt,
<Stack Structure>
 Total number of cell frames: 100 in total (A set of stack body with 25 cell frames stacked in layers is temporarily held, and four sets of stack bodies, each being temporarily held, are stacked in layers), <Electrolyte>
Composition: Vanadium ion concentration: 2.0 mol/L, Free sulfuric acid concentration: 2.0 mol/L, and Added phosphoric acid concentration: 0.3 mol/L,
Quantity of electrolyte: 20 m$^3$, <Clamping Mechanism>
Number of long bolts: 20,
Rate of spring of coil spring: 1,000 (N/m),
Active coils: 3.0,
Contraction from free length of coil spring when clamped: 30 mm, <Results>
Battery efficiency: 86%,
Discharge possible power: 350 kWH,
Others: It was found that even when the cell stack was thermally expanded and contracted during operation, no problem occurred and no leakage of electrolyte from between the cell frames occurred, either.

EXAMPLE 2

Using the cells of the present invention, a different redox flow secondary battery from that of Example 1 was produced, and battery performances and discharge possible power of that redox flow secondary battery was measured. Differences in data on material, size, and others of the cell stack from those of Example 1 and measurement results are shown below.

<Frame>
Size
Outer size: 1,000 mm wide, 500 mm high, and 4 mm thick,
Inner size: 900 mm wide and 300 mm high,
Seal groove: 2 mm wide, 1 mm deep, and 5 mm in distance between grooves,
O-ring size: 1.5 mm in diameter of cross-section of the ring, and 750 mm in diameter,
Inner and outer seal grooves: Arranged on both sides of the cell frame at the locations shifted 8 mm away from each other,
Ratio of diameter of manifold to total width of cell frame: 2%,
Ratio of distance between adjacent manifolds to total width of cell frame: 35%,
Material: Resin comprising 90 mass % vinyl chloride and 10 mass % acrylonitrile-butadiene-styrene copolymer (ABS), <Bipolar Plate>
Size: 0.1 mm thick,
Material: Chlorinated polyethylene containing 10 mass % graphite, <Stack Structure>
Total number of cell frames: 75 in total (A set of stack body with 25 cell frames stacked in layers is temporarily held, and three sets of stack bodies, each being temporarily held, are stacked in layers), <Clamping Mechanism>
Number of long bolts: 24,
Rate of spring of coil spring: 1,600 (N/m),
Active coils: 2.5,
Contraction from free length of coil spring when clamped: 15 mm, <Results>
Battery efficiency: 87%,
Discharge possible power: 450 kWH, Others: It was found that even when the cell stack was thermally expanded and contracted during operation, no problem occurred and no leakage of electrolyte from between the cell frames occurred, either.

CAPABILITIES OF EXPLOITATION IN INDUSTRY

As discussed above, the cell frame for the redox flow battery and the redox flow battery using the cell frame can provide following effects.

The double seal arrangement of the inner and outer seals can prevent the electrolyte from leaking out of the cell frames more effectively. Particularly when the outer seal and the inner seal are spaced apart from each other at a distance so that a break in the membrane cannot be propagated inwardly, there is provided the advantage that even when a break is produced in the membrane, the electrolyte can be substantially completely prevented from leaking out of the cell frames from the break in the membrane.

Also, since this arrangement can allow slight projection of the membrane from the outer periphery of the cell frames, the membrane need not be fabricated with high precision or need not be located so precisely, thus providing very good workability in assembly of the battery.

By the manifolds and a number of guide grooves having a sectional area of 5 mm$^2$ or less being arranged in the cell frame, pressure losses of the electrolytes passing through the manifolds can be reduced and losses caused by electric current flowing in the electrolytes can be suppressed, thus providing improved battery efficiencies.

By the frame members being configured to be symmetrical in relation to an intersection point of diagonal lines of the frames as a center, the frame members can be molded from the same mold, without any need to change the mold for each frame member, thus providing good productivity and economical efficiency. Further, as a result of the frame members being configured to be symmetrical with respect to a point, the cell frames joined to each other also come to be symmetrical with respect to the point. This can provide the result that when stacked, the frame members can be stacked without specifying the orientation of the frame members, thus achieving good workability in assembly.

The invention claimed is:
1. A cell stack for a redox flow battery, comprising:
a cell frame having a first and second side;
electrodes; and
a membrane,
wherein the cell frame, electrodes and membrane are all stacked in layers in the cell stack,
the cell frame has a total of four seals, in which a pair of the seals having an inner seal and an outer seal are arranged directly on the first side of the cell frame, and the other pair of seals arranged on the second side of the cell frame to press contact with the membrane and also seal an electrolyte, and
a part of the membrane is projected from a periphery of the cell frame.

2. The cell stack for the redox flow battery according to claim 1, wherein the inner seal is an O-ring.

3. The cell stack for the redox flow battery according to claim 1, wherein the inner seal and the outer seal are spaced apart from each other at a distance of 1 mm or more.

4. The cell stack for the redox flow battery according to claim 1, wherein the cell frame is provided with a manifold serving as a flow channel of the electrolyte and a guide groove for guiding the electrolyte from the manifold to an inside of the cell frame, and the guide groove has a sectional area of 5 mm² or less.

5. The cell stack for the redox flow battery according to claim 1, wherein a diameter of the manifold is 1%-5% of a total width of the cell frame.

6. The cell stack for the redox flow battery according to claim 4, wherein the cell frame is formed by bonding a pair of frame members to each other, each frame member being configured so that the guide grooves can be symmetrical in relation to an intersection point of diagonal lines of the frames as a center.

7. The redox flow battery according to claim 1, wherein the membrane has a thickness of 400 μm or less.

8. The redox flow battery according to claim 1, which comprises electric terminals for taking out electricity from the electrodes and feeding and discharging portions for feeding and discharging electrolytes to and from the electrodes, the electrical terminals and the feeding and discharging portions being arranged on surfaces opposite to each other.

9. The cell stack for the redox flow battery according to claim 1, wherein
    the inner seals prevent leakage of the electrolyte to an outside of the cell frame and
    the outer seals prevent a break in a part of the membrane projected outwardly of the cell frame from propagating inwardly.

* * * * *

UNITED STATES PATENT AND TRADEMARK OFFICE
CERTIFICATE OF CORRECTION

PATENT NO. : 7,670,719 B2
APPLICATION NO. : 11/979670
DATED : March 2, 2010
INVENTOR(S) : Hiroyuki Nakaishi et al.

It is certified that error appears in the above-identified patent and that said Letters Patent is hereby corrected as shown below:

In Column 13, Line 5 (Claim 5), change "claim 1" to --claim 4--.

Signed and Sealed this

Sixteenth Day of November, 2010

David J. Kappos
*Director of the United States Patent and Trademark Office*